United States Patent
MacNeille et al.

(10) Patent No.: US 9,915,755 B2
(45) Date of Patent: Mar. 13, 2018

(54) VIRTUAL AMBIENT WEATHER CONDITION SENSING

(75) Inventors: Perry Robinson MacNeille, Lathrup Village, MI (US); Steven Joseph Szwabowski, Northville, MI (US); Dimitar Petrov Filev, Novi, MI (US); Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1794 days.

(21) Appl. No.: 12/972,981

(22) Filed: Dec. 20, 2010

(65) Prior Publication Data

US 2012/0158207 A1 Jun. 21, 2012

(51) Int. Cl.
*G01W 1/00* (2006.01)

(52) U.S. Cl.
CPC ..................... *G01W 1/00* (2013.01)

(58) Field of Classification Search
USPC ............................................ 701/1, 415, 423
See application file for complete search history.

(56) References Cited

U.S. PATENT DOCUMENTS

| | | |
|---|---|---|
| 5,781,125 A | 7/1998 | Godau et al. |
| 5,922,041 A | 7/1999 | Anderson |
| 6,064,322 A | 5/2000 | Ohira |
| 6,337,621 B1 | 1/2002 | Ogino et al. |
| 6,356,839 B1 | 3/2002 | Monde et al. |
| 6,434,455 B1 | 8/2002 | Snow et al. |
| 6,553,292 B2 | 4/2003 | Kokes et al. |
| 6,598,183 B1 | 7/2003 | Grieco et al. |
| 6,603,394 B2 | 8/2003 | Raichle et al. |
| 6,611,740 B2 | 8/2003 | Lowrey et al. |

(Continued)

FOREIGN PATENT DOCUMENTS

| | | |
|---|---|---|
| CN | 1481512 A | 3/2004 |
| CN | 1657880 A | 8/2005 |

(Continued)

OTHER PUBLICATIONS

DrewTech gets you on the Bus, article printed from www.drewtech.com, Dec. 16, 2009.

(Continued)

*Primary Examiner* — Imran K Mustafa
(74) *Attorney, Agent, or Firm* — Jennifer Stec; Brooks Kushman P.C.

(57) ABSTRACT

A system for providing weather conditions includes a server in communication with a weather data provision service. The server includes a middleware application operable to process weather data requests. The system also includes a gps module, and at least one component control system, operable to adjust at least one parameter associated with at least one vehicle component. Finally, the illustrative system includes a vehicle computing system, in communication with the GPS module, the at least one component control system, and the server. In response to a request for data from the component control system, the vehicle computing system passes GPS data to the server, including the request for data, and the vehicle computing system responsively receives the requested data from the server. The vehicle computing system relays the received data to the component control system that requested the data.

18 Claims, 5 Drawing Sheets

(56) References Cited

U.S. PATENT DOCUMENTS

| | | |
|---|---|---|
| 6,611,755 B1 | 8/2003 | Coffee et al. |
| 6,636,790 B1 | 10/2003 | Lightner et al. |
| 6,687,587 B2 | 2/2004 | Kacel |
| 6,738,697 B2 | 5/2004 | Breed |
| 6,778,888 B2 | 8/2004 | Cataldo et al. |
| 6,978,198 B2 | 12/2005 | Shi |
| 7,146,307 B2 | 12/2006 | Mocek |
| 7,155,321 B2 | 12/2006 | Bromley et al. |
| 7,209,490 B2 | 4/2007 | Isaac et al. |
| 7,228,211 B1 | 6/2007 | Lowrey et al. |
| 7,232,962 B2 | 6/2007 | Rynd |
| 7,277,780 B2 | 10/2007 | Meier-Arendt et al. |
| 7,340,365 B2 | 3/2008 | Wubbena et al. |
| 7,343,526 B2 | 3/2008 | Aditham |
| 7,356,394 B2 | 4/2008 | Burgess |
| 7,366,934 B1 | 4/2008 | Narayan et al. |
| 7,379,541 B2 | 5/2008 | Iggulden et al. |
| 7,406,382 B2 | 7/2008 | Brulle-Drews |
| 7,487,074 B2 | 2/2009 | Ohtsu et al. |
| 7,493,209 B1 | 2/2009 | Altrichter et al. |
| 7,522,995 B2 | 4/2009 | Nortrup |
| 7,532,962 B1 | 5/2009 | Lowrey et al. |
| 7,590,476 B2 | 9/2009 | Shumate |
| 7,905,815 B2 | 3/2011 | Ellis et al. |
| 7,983,839 B2 | 7/2011 | Sutardja |
| 8,024,111 B1 | 8/2011 | Meadows et al. |
| 8,103,443 B2 | 1/2012 | Kantarjiev et al. |
| 8,126,644 B2 | 2/2012 | Amano |
| 8,140,358 B1 | 3/2012 | Ling et al. |
| 8,185,299 B2 | 5/2012 | Fujiwara et al. |
| 8,219,249 B2 | 7/2012 | Harrod et al. |
| 8,285,439 B2 | 10/2012 | Hodges |
| 8,315,802 B2 | 11/2012 | Brown |
| 8,364,402 B2 | 1/2013 | Ross et al. |
| 8,390,473 B2 | 3/2013 | Krzyzanowski et al. |
| 8,392,105 B2 | 3/2013 | Desborough |
| 2002/0035429 A1 | 3/2002 | Banas |
| 2002/0173885 A1 | 11/2002 | Lowrey et al. |
| 2003/0034769 A1 | 2/2003 | Lipscomb et al. |
| 2003/0036832 A1 | 2/2003 | Kokes et al. |
| 2003/0163587 A1 | 8/2003 | Knight et al. |
| 2004/0024502 A1 | 2/2004 | Squires et al. |
| 2004/0044454 A1 | 3/2004 | Ross et al. |
| 2004/0054503 A1 | 3/2004 | Namaky |
| 2004/0093134 A1 | 5/2004 | Barber et al. |
| 2004/0128071 A1 | 7/2004 | Schradi |
| 2004/0172177 A1 | 9/2004 | Nagai et al. |
| 2004/0194479 A1* | 10/2004 | Umebayashi ...... B60H 1/00642 62/126 |
| 2004/0218894 A1 | 11/2004 | Harville et al. |
| 2005/0090939 A1 | 4/2005 | Mills et al. |
| 2005/0096020 A1 | 5/2005 | Oesterling |
| 2005/0097541 A1 | 5/2005 | Holland |
| 2005/0187714 A1 | 8/2005 | Brulle-Drews |
| 2005/0192724 A1 | 9/2005 | Hendry |
| 2005/0220311 A1* | 10/2005 | Sun et al. .......... 381/77 |
| 2005/0281414 A1 | 12/2005 | Simon et al. |
| 2006/0034231 A1 | 2/2006 | Tailor |
| 2006/0041348 A1 | 2/2006 | Liebl et al. |
| 2006/0064232 A1* | 3/2006 | Ampunan ................ B60T 7/16 701/115 |
| 2006/0130033 A1 | 6/2006 | Stoffels et al. |
| 2006/0132291 A1 | 6/2006 | Dourney, Jr. et al. |
| 2006/0155437 A1 | 7/2006 | Wang et al. |
| 2006/0229777 A1 | 10/2006 | Hudson et al. |
| 2006/0253235 A1 | 11/2006 | Bi et al. |
| 2007/0121959 A1 | 5/2007 | Philipp |
| 2007/0162796 A1 | 7/2007 | Chan et al. |
| 2007/0171029 A1 | 7/2007 | Inbarajan |
| 2007/0179799 A1 | 8/2007 | Laghrari |
| 2008/0015748 A1 | 1/2008 | Nagy |
| 2008/0027605 A1 | 1/2008 | Oesterling |
| 2008/0027606 A1 | 1/2008 | Helm |
| 2008/0082226 A1 | 4/2008 | Amador et al. |
| 2008/0140281 A1 | 6/2008 | Morris et al. |
| 2008/0147267 A1 | 6/2008 | Plante et al. |
| 2008/0147313 A1* | 6/2008 | Nesbitt .......... 701/201 |
| 2008/0162033 A1 | 7/2008 | Wagner et al. |
| 2008/0167056 A1 | 7/2008 | Gilzean et al. |
| 2008/0167078 A1* | 7/2008 | Eibye ............... H04M 1/72522 455/566 |
| 2008/0172357 A1* | 7/2008 | Rechis .............. G06F 17/3087 |
| 2008/0216067 A1 | 9/2008 | Vining |
| 2008/0269975 A1 | 10/2008 | Bertosa et al. |
| 2009/0063038 A1 | 3/2009 | Shrivathsan et al. |
| 2009/0063045 A1 | 3/2009 | Figueroa et al. |
| 2009/0143937 A1 | 6/2009 | Craig |
| 2009/0177352 A1 | 7/2009 | Grau et al. |
| 2009/0177506 A1 | 7/2009 | Jiang |
| 2009/0210145 A1 | 8/2009 | Amano |
| 2009/0276115 A1 | 11/2009 | Chen |
| 2009/0292416 A1 | 11/2009 | Ubik et al. |
| 2009/0308134 A1 | 12/2009 | Pepper |
| 2009/0325757 A1 | 12/2009 | Andreasen et al. |
| 2009/0326949 A1 | 12/2009 | Douthitt et al. |
| 2009/0326991 A1 | 12/2009 | Wei et al. |
| 2010/0042287 A1 | 2/2010 | Zhang et al. |
| 2010/0042288 A1 | 2/2010 | Lipscomb et al. |
| 2010/0056055 A1 | 3/2010 | Ketari |
| 2010/0082559 A1 | 4/2010 | Sumcad et al. |
| 2010/0146436 A1* | 6/2010 | Jakobson et al. ............. 715/800 |
| 2010/0204878 A1 | 8/2010 | Drew et al. |
| 2010/0245123 A1 | 9/2010 | Prasad et al. |
| 2010/0246846 A1 | 9/2010 | Burge et al. |
| 2010/0256861 A1 | 10/2010 | Hodges |
| 2010/0262335 A1 | 10/2010 | Brozovich |
| 2011/0022422 A1 | 1/2011 | Taylor |
| 2011/0041088 A1 | 2/2011 | Mason et al. |
| 2011/0046883 A1 | 2/2011 | Ross et al. |
| 2011/0098716 A1* | 4/2011 | Siliski et al. ............... 701/201 |
| 2011/0190962 A1 | 8/2011 | Peterson et al. |
| 2011/0201302 A1 | 8/2011 | Hatton |
| 2011/0225096 A1 | 9/2011 | Cho et al. |
| 2011/0258044 A1 | 10/2011 | Kargupta |
| 2011/0276218 A1 | 11/2011 | Dwan et al. |
| 2011/0276219 A1 | 11/2011 | Swarninathan et al. |
| 2012/0029762 A1 | 2/2012 | Ubik et al. |
| 2012/0030512 A1 | 2/2012 | Wadhwa et al. |
| 2012/0053782 A1 | 3/2012 | Gwozdek et al. |
| 2012/0072055 A1 | 3/2012 | Barlsen et al. |
| 2012/0075092 A1 | 3/2012 | Petite et al. |
| 2012/0264376 A1 | 10/2012 | Breed |
| 2012/0294238 A1 | 11/2012 | Uhler |

FOREIGN PATENT DOCUMENTS

| | | |
|---|---|---|
| CN | 101303800 A | 11/2008 |
| CN | 101799983 A | 8/2010 |
| EP | 0808492 | 8/1996 |
| JP | 9264819 A | 10/1997 |
| JP | 11326140 A | 11/1999 |
| JP | 2006018680 A | 1/2006 |

OTHER PUBLICATIONS

The CarDAQ-Plus Advantage, Drew Technologies, Inc.
Software, Pass Thru Pro II, J2534 Flash Reprogramming, printed from buy1.snapon.com, Dec. 3, 2009.
Integrated Diagnostic System (IDS), Ford, Lincoln, Mercury.
Pegisys PC Diagnostic System, PC-based J2534 Reprogramming & Scan Tool, printed from www.otctools.com.
Introduction to J2534 and Flash Reprogramming, Drew Technologies, Copyright 2009.
CarDAQ-Plus, Drew Technologies, Inc.
Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).

(56) References Cited

OTHER PUBLICATIONS

Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.
Dynetics Vehicle Data Recorder Models DVG-II and WDVG-II (2009) printout from www.dynetics-ia.com.
Chinese Patent Office, First Office Action for corresponding Chinese Patent Application No. 201110414988.2 dated Dec. 26, 2014.

* cited by examiner

VIRTUAL AMBIENT WEATHER CONDITION SENSING

BACKGROUND

Modern automobiles may be provided with a variety of onboard weather condition sensors. These can include, but are not limited to, temperature sensors, rain sensors, barometers, etc. Capable of gathering weather data at a vehicle location, the output from these sensors can be fed back into a vehicle computing system to adjust vehicle components and settings.

Weather conditions can affect a variety of vehicle systems. On a basic level, rain or snow can make driving treacherous. Accordingly, if rain or snow is detected by a sensor, a vehicle can engage traction control, all wheel or four wheel drive automatically in order to provide a safer driving experience. Similarly, detection of rain could cause the trigger of an automatic start to windshield wipers, for example.

Vehicle sensors may be limited in their capabilities, however. Since vehicles are typically in motion, much of the data gathered by the sensors actually correlates to conditions at a previous point of travel. This may also make it difficult to take certain measurements, such as humidity, unless the humidity can be instantaneously measured from the air around a moving vehicle.

SUMMARY

In a first illustrative embodiment, a system for gathering and providing ambient weather conditions includes a server, in communication with at least one weather data provision service. This illustrative server, in this embodiment, includes one or more middleware applications operable to receive and process weather data requests.

The illustrative system also includes a GPS module, operable to determine vehicle GPS coordinates. The system further includes at least one component control system, operable to adjust at least one parameter associated with at least one vehicle component. Finally, the illustrative system includes a vehicle computing system, in communication with the GPS module, the at least one component control system, and the server.

In this illustrative embodiment, in response to a request for data from the component control system, the vehicle computing system passes GPS data to the server. The illustrative request also includes the request for data, and the vehicle computing system responsively receives the requested data from the server, the server having gathered the data from the at least one weather data provision service based at least in part on the GPS data passed from the vehicle computing system.

Further, in this illustrative embodiment, the vehicle computing system relays the received data to the component control system that requested the data.

In a second illustrative embodiment, a computer-implemented method of vehicle component adjustment includes determining, via a GPS module in communication with a vehicle computing system, vehicle GPS coordinates. The illustrative method also includes requesting, from a vehicle component control system, in response to a predetermined condition, weather data. In this illustrative embodiment, the request was sent to the vehicle computing system.

The illustrative method further includes relaying, from the vehicle computing system, the request and the GPS coordinates to a remote server. The request also includes receiving, responsive to the relayed request, the requested weather data at the vehicle computing system. Further, in this illustrative embodiment, the method includes sending the data received at the vehicle computing system to the vehicle component control system. Finally, the illustrative method includes adjusting, via the vehicle component control system and responsive to the data sent from the vehicle computing system to the vehicle component control system, at least one parameter of a vehicle component controlled by the vehicle component control system.

In still a third illustrative embodiment, a computer readable storage medium stores instructions that, when executed, cause a vehicle computing system to execute the steps including determining if requested data is available in response to a request for weather data from a vehicle component control system. The illustrative steps also include, conditional on the availability of the data, sending a request to a remote server for the requested data, the request including the GPS position of the vehicle.

The illustrative steps further include receiving a response to the weather data request from the remote server. Finally, the illustrative steps include relaying the response, to the weather data request, to the vehicle component control system.

DETAILED DESCRIPTION OF THE DRAWINGS

Figure 1:
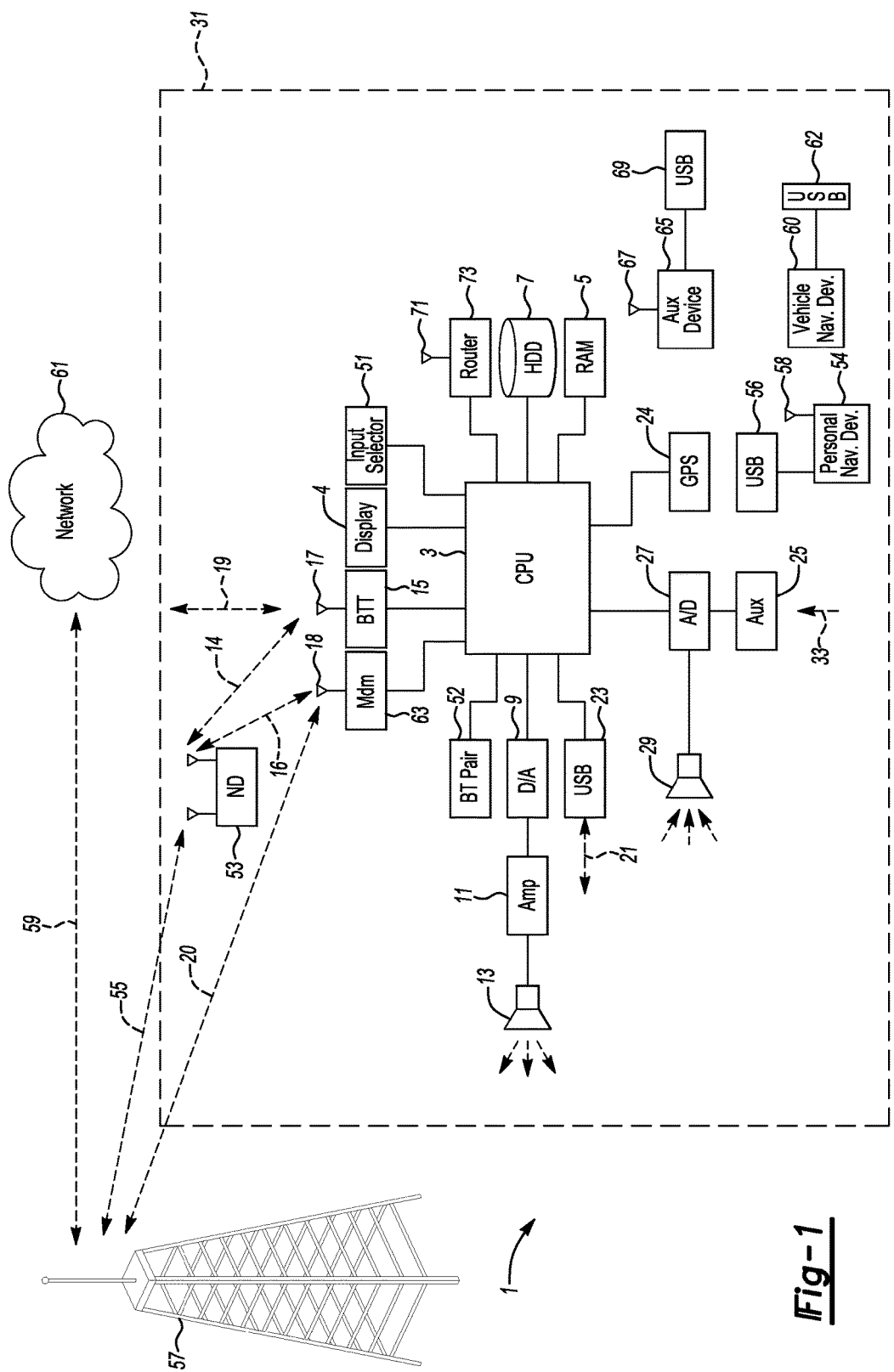
FIG. 1 illustrates an example block topology for a vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Increasing electronics content, growing computing power and proliferation of opportunities for information connectivity (through improved sensors, GPS, road and traffic information systems, wireless internet access, vehicle-to-vehicle communication, etc.) may be used to significantly impact automotive vehicle control and diagnostic strategies.

One aspect of increasing vehicle connectivity is increased availability of access to ambient and road condition information, such as, but not limited to, ambient temperature, ambient pressure, humidity, cloudiness, visibility, cloud ceiling, precipitation, rain droplet size, wind speed and wind direction. This information may be obtained, for example, from a remote source such as a server serving out weather information.

Figure 2:
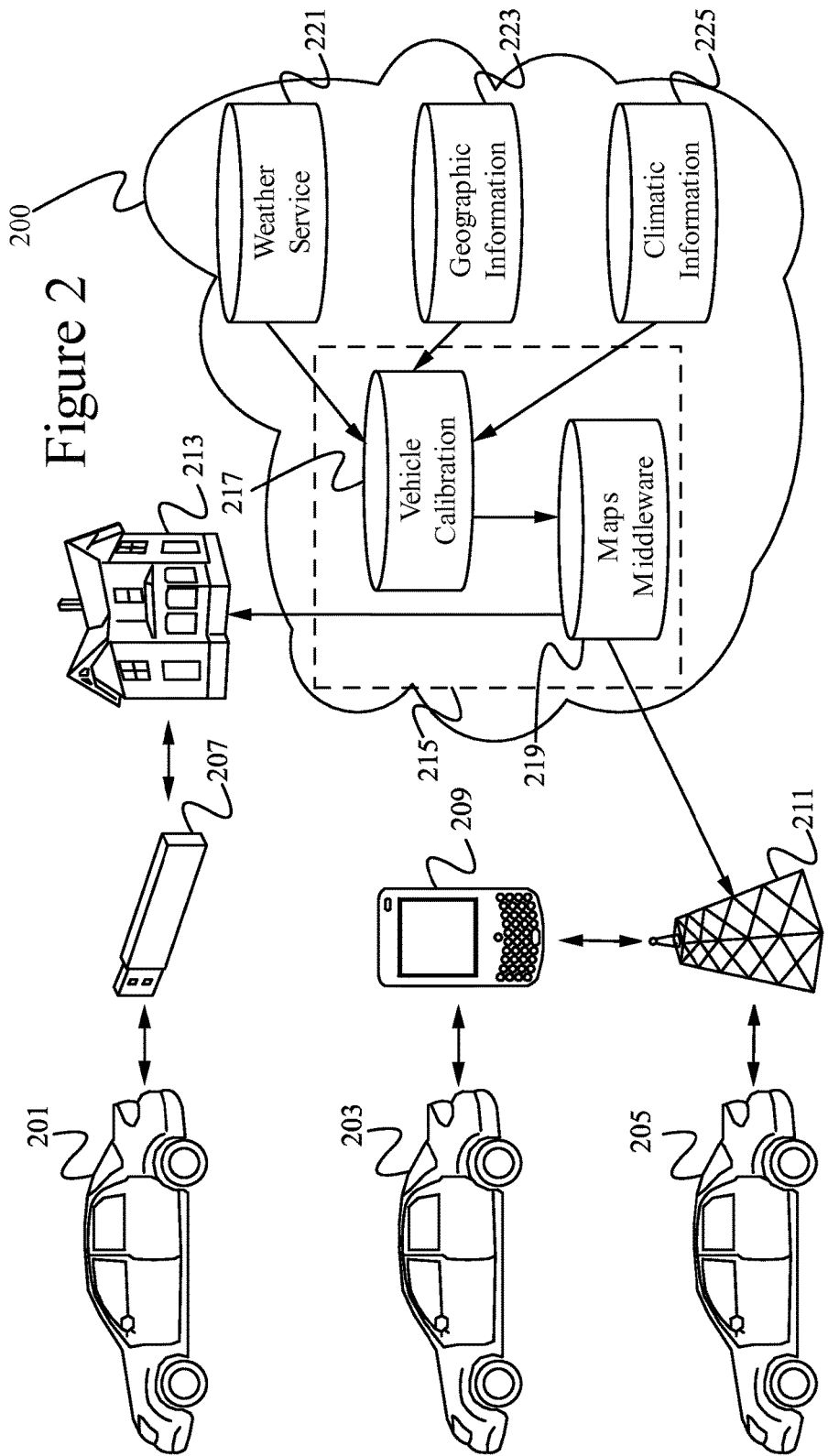
FIG. 2 shows an illustrative example of a data collection and distribution network.

In one illustrative example shown in FIG. 2, information may flow from the internet to the vehicle over a wireless or wired connection. A vehicle computing system in a vehicle 201, 203, 205 may receive information from a remote network 200 in response to requests for general or specific information.

This information may be relayed, for example, without limitation, through a home PC 213 and transferred via a memory stick 207, or through a wireless network 211. The wireless network may connect directly to a vehicle 207, or may connect to a vehicle through a remote wireless device, such as a cellular phone or pda 209.

The vehicle computing system may then relay the information to one or more vehicle components to be utilized for vehicle control or driver information functions. Because data can be gathered from multiple independent sources, via the remote network, a level of redundancy can be achieved that aids in both verifying information and providing a further degree of accuracy with respect to gathered information.

By combining data from one or more weather services 221, geographical information services 223 and climatic information services 225 at, for example, a vehicle calibration data server 219, a comprehensive picture of ambient weather conditions can be achieved. This data may also be combined with merged mapping data 215 (in this example, both the calibration server and map server are maintained by a vehicle service provider in conjunction 219). This may result in a map unifying road maps, synoptic weather maps, vehicle locations, climatic maps, weather station locations, etc. The resulting synced data (or simply the combined weather data) may be delivered to a vehicle computing system for further use or processing.

In one illustrative embodiment, incoming weather condition data is relayed to various vehicle systems through the vehicle Controller Area Network (CAN) bus (or network). By placing incoming data on the CAN network, a variety of vehicle systems can access the data as needed. New data can also thus easily be integrated into use by vehicle control systems. This allows for the dynamic addition of new signals and data without a need to reconfigure or design any hardwired circuitry (to receive a new sensor, for example).

Additionally, in this example, the sensors detecting the data used to determine the weather conditions are not subjected to extraneous data or stresses created by the vehicle itself. This may help make the gathered data more reliable.

Further, a variety of data types are impractical to measure at a vehicle using onboard sensors. For example, wind speed and direction may be virtually impossible to measure, since the airflow around the vehicle will be dictated by the vehicle's speed and heading, and will likely over-ride any sensing of ambient conditions (unless the vehicle is kept completely still). Additional data types that may be newly measured include, but are not limited to, cloud cover, wind chill, relative humidity and a dew point, precipitation, rain droplet size and road surface temperature.

Of course, in this exemplary model the sensors are not located at the location of the vehicle (unless the vehicle happens to be passing underneath a sensor) and so some data may need to be interpolated for the vehicle's location. The greater the amount of data points that are available for an area, the easier this extrapolation may be to do. If the vehicle is also equipped with certain sensors, a combination of vehicle sensed data and internet data can be combined to produce an even higher degree of accuracy.

Data may generally be interpolated in space (earth's surface) and extrapolated in time. There may also be circumstances where it will also be extrapolated in space. This may involve the use of forecast models, analog techniques, persistence forecasts, climatic forecasts, nowcasting techniques, etc. Also a vertical atmospheric stability model could be used to extrapolate surface data to the altitude of the vehicle.

Finally, vehicles may also be outfitted with on-board navigation systems (or have GPS devices in communication with a vehicle computer). Using a projected route-to-be-traveled, the ambient weather data can be used to anticipate changes in the ambient conditions along a vehicle's route and actively and predictively (as opposed to reactively) activate certain vehicle systems. For example, without limitation, the vehicle computing system could anticipate a condition in which ice crystals may form on a vehicle's windshield, and activate an automatic defrost mechanism just prior to the vehicle entering that portion of the route, such that the ice is prevented from ever forming (instead of reactively activating the system in response to the formation of ice).

Figure 3:
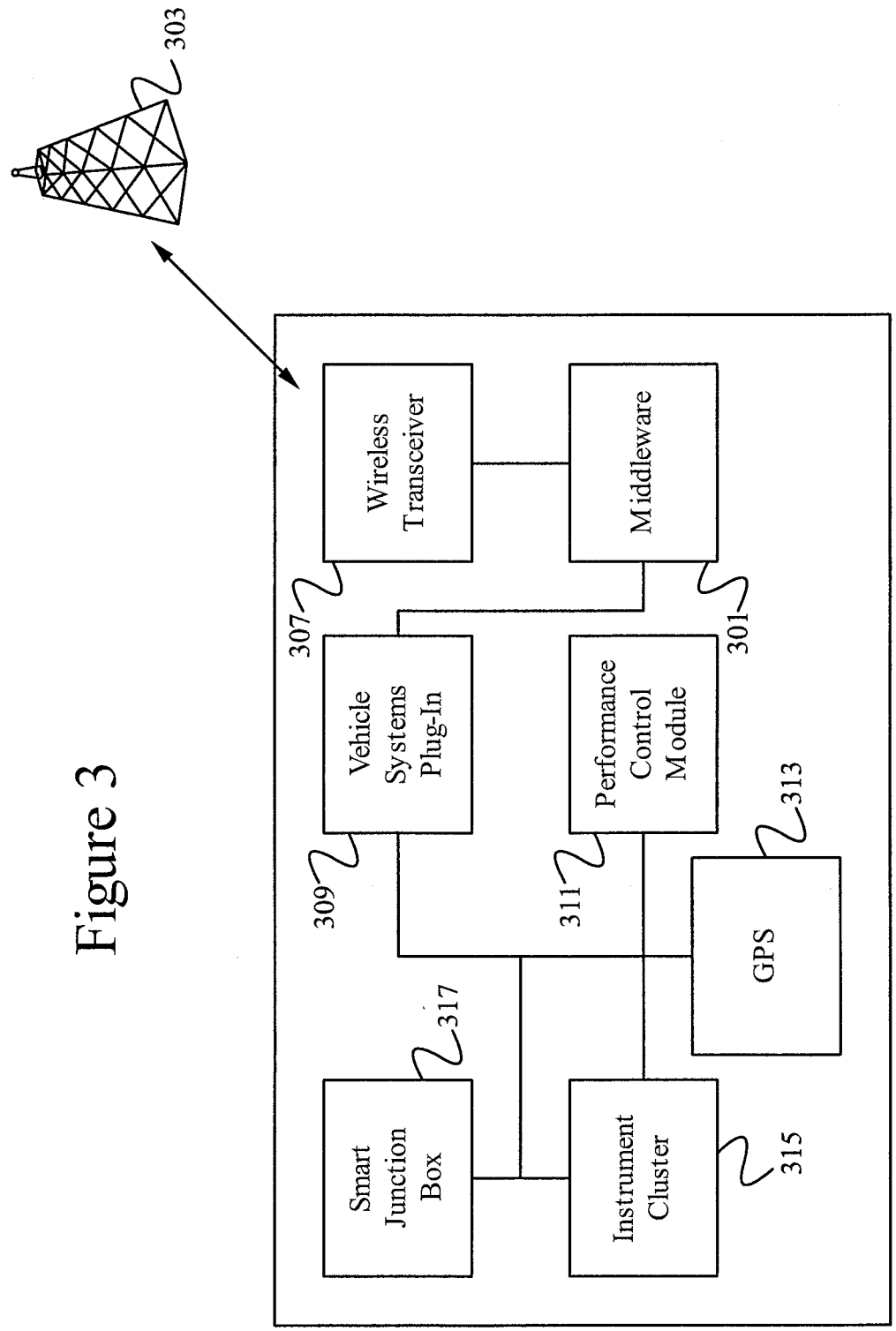
FIG. 3 shows an illustrative example of a vehicle computing system interaction with a vehicle control system and a remote network.

FIG. 3 shows an illustrative example of a vehicle computing system interacting with a remote network 303 and various vehicle control systems. In this illustrative embodiment, middleware (running, for example, on a vehicle computing system) receives data from a wireless transceiver 307 connected to a remote network 303.

The vehicle computing system delivers, through middleware 301, the information to a vehicle systems plug-in 309. From there, the information can be delivered to a variety of vehicle systems, including, but not limited to, a powertrain control module (PCM) 311, a routing-engine 313, an instrument cluster 315 and a smart junction box 317. Additional modules may include, but not be limited to, climate control module, traction control, brake, steering, body control modules, etc.

Figure 4:
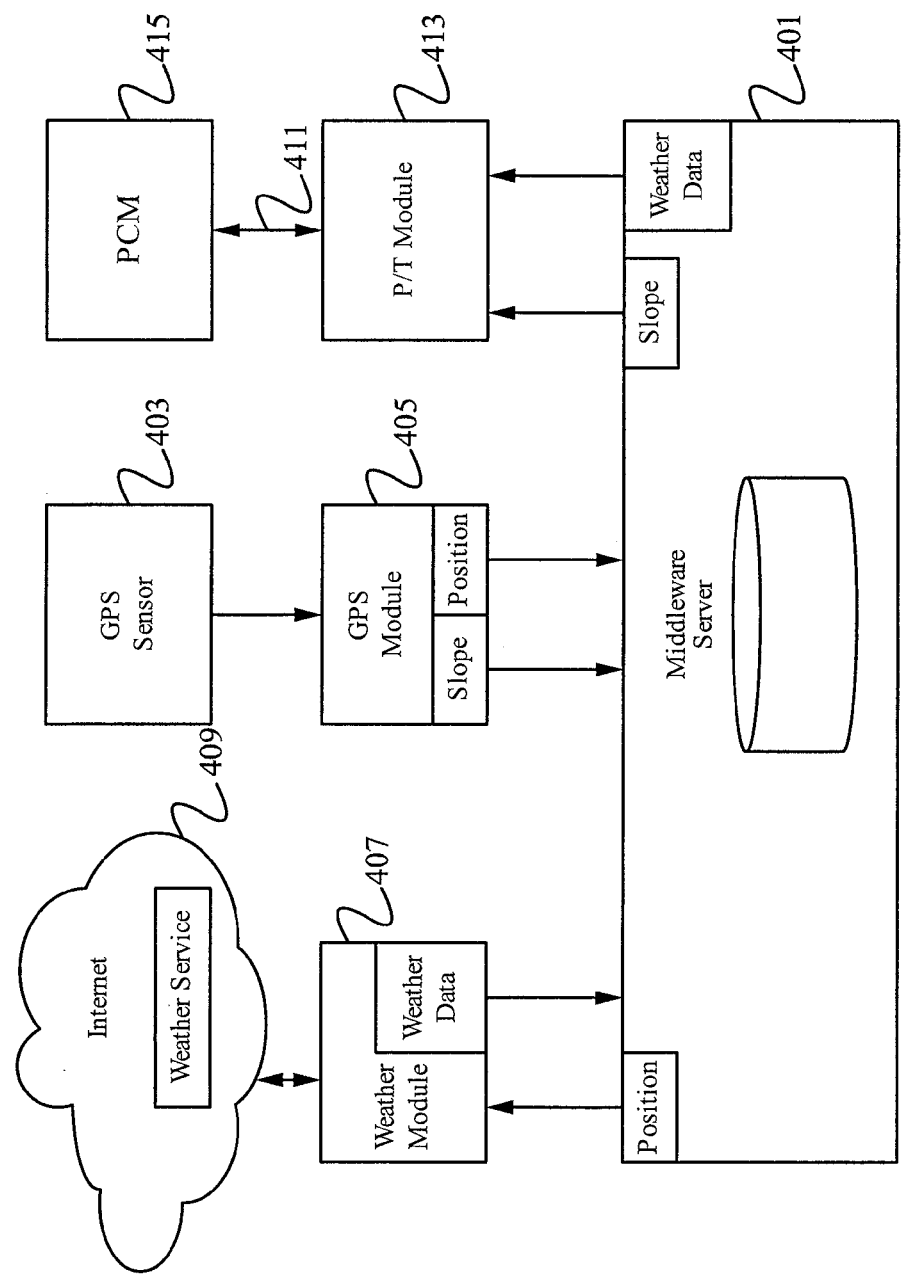
FIG. 4 shows an illustrative example of an information gathering system.

FIG. 4 shows an illustrative example of an information gathering system including a remote data source, a vehicle GPS location determination sensor, and a P/T module. In this example, a vehicle senses information such as, but not limited to, a GPS location 403 obtain a location of the vehicle, elevation, speed, bearing, acceleration, time, signal strength, HDOP, VDOP, signal to noise ratio, etc. and sends that information through a GPS module 405 where the information is transformed into units acceptable to the P/T module and a weather module before being transmitted to the middleware server 401.

Once the data is received from the GPS sensor at the middleware server, it is relayed to both the P/T module 413 and a weather control module 407. Using the vehicle's GPS location, the weather control module 407 can obtain (or extrapolate) data from a weather service 409. The data may include, but is not limited to, relative humidity, barometric pressure and ambient temperature at the vehicle's location. This data can then be relayed to the middleware server 401.

The weather module may also perform intermediary tasks such as converting relative humidity into specific humidity and reformatting the data. This formatted data may be relayed to the P/T module through the middleware server 401.

At the P/T module, the weather data received from the weather module may be combined with elevation data received from the GPS module and this information may be transmitted to a vehicle CAN bus (or network) 411. Once the data is on the CAN network, vehicle control systems such as the PCM 415 may retrieve the data for use in controlling various vehicle systems.

The P/T module may continue to receive and publish weather data throughout the course of vehicle travel. As previously noted, data for future locations along a projected route may also be transferred in this manner, and used by the PCM (or other systems) to predictively adjust vehicle system settings.

Data gathered and provided to a vehicle in this manner can open up a whole new field of analysis and control of vehicle systems and settings. Weather conditions can affect vehicle systems in a myriad of manners, and given the capabilities of current vehicle sensors in many vehicles, these conditions are simply dealt with as a cost of operating in an inefficient system. By providing accurate, projected and more expansive data, vehicle systems can be fine tuned to improve operating conditions, component life, fuel efficiency and driving safety.

As one non-limiting example, the use of humidity in a vehicle system control environment can be examined. Currently, it is not common to measure humidity at a vehicle using on-board sensors. Humidity can be measured accurately with low time latency, but there may be confusion about what is actually being measured and what is needed. For example, specific humidity, relative humidity, dew point, wet/dry ball measurements actually refer to different measurements for different atmospheric characteristics, and it may be inaccurate to derive one from another. Another problem is that the humidity varies throughout powertrain, so it not necessarily clear where a sensor should be placed. Further, vehicle sensors are very cost controlled and may fail in service. The vehicle environment is very rigorous, with vibration, unstable power, harsh chemicals, etc. Therefore virtual sensors help contain warrantee costs and possible malfunctions.

Humidity, however, is one of the largest noise factors affecting accuracy of hot-wire air mass flow sensors as it influences thermal conductivity, specific heat and molecular viscosity of air (which affects the relation between airflow and current through hot wire). Humidity may also be a significant factor for ammonia sensors, which have been proposed for urea dosing control in diesel engines and for on-board diagnostics.

Humidity also changes the oxygen concentration in fresh air. The oxygen concentration of a standard atmosphere is assumed during adaptation of voltage characteristics of certain exhaust sensors, such as oxygen sensors, that are commonly used in modern vehicles.

Humidity also affects combustion, in particular, MBT spark timing and borderline spark timing. Thus, if humidity is known, fuel economy can be improved by operating the engine closer to MBT spark timing without the occurrence of knock.

Also, when combined with the ambient air temperature, humidity is helpful for determining the dew point of exhaust recirculation gasses for cooled EGR. Sensing of humidity can offer robustness, fuel economy and emissions improvements. Further benefits and improvements can be obtained by sensing of, for example, without limitation, ambient temperature, ambient pressure, cloudiness, visibility, cloud ceiling, precipitation, rain droplet size, wind speed, wind direction, etc.

Figures 5A, 5B:
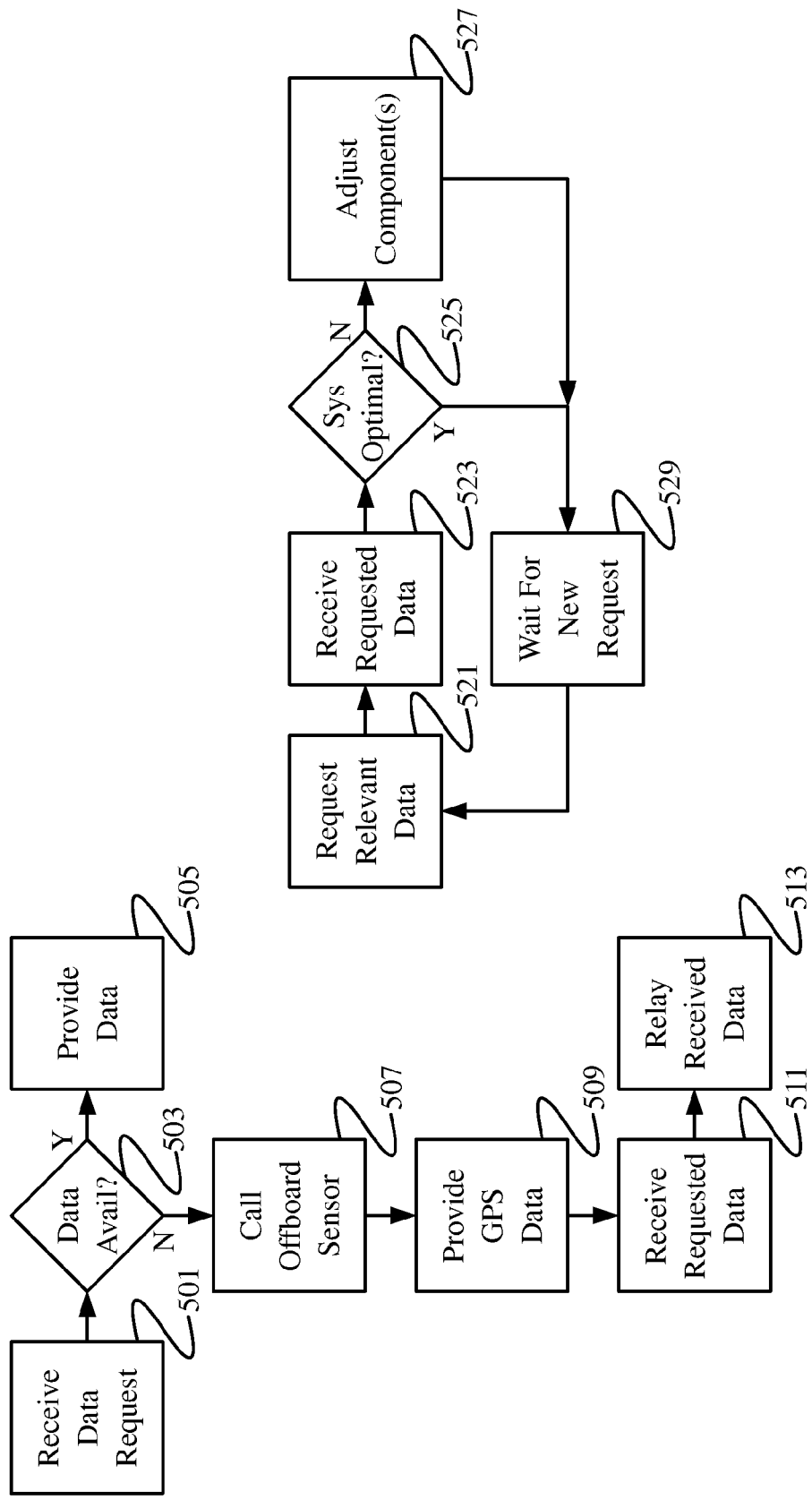
FIGS. 5A and 5B show exemplary processes for configuring a vehicle system using remotely collected data.

FIGS. 5A and 5B show exemplary processes for configuring a vehicle system using remotely gathered ambient condition data. In this illustrative process, a vehicle computing system receives a request from a vehicle control system (such as a PCM) for a particular piece of data 501. Since some data may either be available from on-board sensors or a previous request, the system then checks to see if the data is already available at the vehicle 503. If so, the data is provided to the requesting computing system.

If the data is not available, the vehicle computing system sends a request to an offboard sensor or sensors 507. As previously noted, this request may be passed through middleware and/or a remote server.

In addition to the request, the vehicle computing system sends the coordinates of the vehicle 509, so that the proper sensor can be chosen. The requested data is then received back at the vehicle 511 and is relayed to the requesting vehicle control system 513.

FIG. 5B shows an exemplary process for adjusting a vehicle control system using offboard sensor data. In this illustrative embodiment, the vehicle control system requests relevant ambient condition data 521. This data will likely vary based on which vehicle control system is requesting the data. The vehicle control system receives the requested data 523 and, using the requested data, checks to see if the parameters of one or more controlled components are optimal in light of the data 525. If there is an inefficiency that can be corrected and should be corrected, based on the requested and received data, the vehicle control system adjusts the component(s) accordingly 527. Otherwise, the control system will idle 529 until another requested is needed. The system may simply periodically send requests, send requests based on detected conditions, etc.

Although numerous examples of illustrative embodiments have been presented herein, these are provided for the purpose of showing examples, and are not intended to limit the scope of the invention by their inclusion. Instead, the invention is only limited by the scope of the claims presented herewith.

What is claimed:

1. A system for gathering and providing ambient weather conditions, comprising:
   a server, in communication with at least one weather data provision service, and including one or more middleware applications operable to receive and process weather data requests;
   a gps module, operable to determine vehicle GPS coordinates;
   a power-train control module (PTCM), operable to adjust at least one power-train parameter; and
   a vehicle computing system, in communication with the GPS module, the PTCM, and the server, wherein
   in response to a request for data from the PTCM, the vehicle computing system passes GPS data to the server, along with the request for data, and responsively receives the requested data from the server, the server having gathered the data from the at least one weather data provision service based at least in part on the GPS data passed from the vehicle computing system, wherein
   the vehicle computing system relays the received data to the PTCM that requested the data for use by the PTCM in responsively adjusting the at least one power-train parameter.

2. The system of claim 1, wherein the data is temperature data.

3. The system of claim 1, wherein the data is humidity data.

4. The system of claim 1, wherein the data is precipitation data.

5. The system of claim 1, wherein the data is wind speed data.

6. The system of claim 1, wherein the data is wind-chill data.

7. A computer-implemented method comprising: determining vehicle GPS coordinates;
   requesting, originating from a power-train control module (PTCM), weather data corresponding to current and projected GPS coordinates from a vehicle computing system (VCS);
   receiving, at the PTCM, requested weather data relayed from a remote system through the VCS; and
   responsive to the weather data, adjusting at least one parameter of power-train control controlled by the PTCM as current GPS coordinates correspond to received weather data coordinates.

8. The method of claim 7, wherein the data is temperature data.

9. The method of claim 7, wherein the data is humidity data.

10. The method of claim 7, wherein the data is precipitation data.

11. The method of claim 7, wherein the data is wind speed data.

12. The method of claim 7, wherein the data is wind-chill data.

13. A computer readable storage medium storing instructions that, when executed, cause a vehicle computing system to execute the steps comprising:
   determining if requested data is available in response to a request for weather data from a power-train control module (PTCM);

conditional on the availability of the data, sending a request to a remote server for the requested data, the request including the GPS position of the vehicle;

receiving a response to the weather data request from the remote server; and relaying the response, to the weather data request, to the PTCM for use by the PTCM in responsively adjusting at least one parameter associated with the vehicle component.

14. The computer readable storage medium of claim 13, wherein the data is temperature data.

15. The computer readable storage medium of claim 13, wherein the data is humidity data.

16. The computer readable storage medium of claim 13, wherein the data is precipitation data.

17. The computer readable storage medium of claim 13, wherein the data is wind speed data.

18. The computer readable storage medium of claim 13, wherein the data is wind-chill data.

* * * * *